US010183219B2

United States Patent
Linden et al.

(10) Patent No.: US 10,183,219 B2
(45) Date of Patent: Jan. 22, 2019

(54) SYSTEM AND METHOD FOR CROSS-PLATFORM MULTIPLAYER VIDEOGAMES

(71) Applicants: John Linden, Santa Monica, CA (US); Steve Pearce, Santa Monica, CA (US); Jamie Jackson, Santa Monica, CA (US); Michael Gesner, Santa Monica, CA (US); Trey Watkins, Santa Monica, CA (US)

(72) Inventors: John Linden, Santa Monica, CA (US); Steve Pearce, Santa Monica, CA (US); Jamie Jackson, Santa Monica, CA (US); Michael Gesner, Santa Monica, CA (US); Trey Watkins, Santa Monica, CA (US)

(73) Assignee: Activision Publishing, Inc., Santa Monica, CA (US)

(*) Notice: Subject to any disclaimer, the term of this patent is extended or adjusted under 35 U.S.C. 154(b) by 1090 days.

(21) Appl. No.: 14/089,482

(22) Filed: Nov. 25, 2013

(65) Prior Publication Data

US 2015/0051001 A1 Feb. 19, 2015

Related U.S. Application Data

(60) Provisional application No. 61/866,005, filed on Aug. 14, 2013.

(51) Int. Cl.
*A63F 13/30* (2014.01)
*A63F 13/87* (2014.01)
(Continued)

(52) U.S. Cl.
CPC .............. *A63F 13/30* (2014.09); *A63F 13/48* (2014.09); *A63F 13/795* (2014.09); *A63F 13/87* (2014.09);
(Continued)

(58) Field of Classification Search
CPC ........ A63F 13/87; A63F 13/795; A63F 13/78; A63F 13/30; A63F 13/323; A63F 13/332;
(Continued)

(56) References Cited

U.S. PATENT DOCUMENTS 7,789,741 B1 * 9/2010 Fields ...................... A63F 13/10
463/2
2003/0216177 A1 * 11/2003 Aonuma ................. A63F 13/10
463/32
(Continued)

OTHER PUBLICATIONS

Just Dance 4 from Wikipedia, https://en.wikipedia.org/wiki/Just_Dance_4 , pp. 1-2, retrieved on Mar. 20, 2017.*
(Continued)

*Primary Examiner* — Jasson Yoo
(74) *Attorney, Agent, or Firm* — Klein, O'Neill & Singh, LLP (57) ABSTRACT

Videogame players may play a first person genre videogame on a game console or on a mobile device, with play on the mobile device utilizing a real time strategy game pattern presentation instead of a first person genre game pattern. In some embodiments of a multiplayer game, a first player plays a first person shooter game using a game console, with presentation of game play utilizing a first person genre game pattern, while a second player on a mobile device playing the game is provided a strategy game pattern presentation. In some embodiments computer control of the second player controllable entities is provided, absent other commands from the second player, or in accordance with commands from the second player.

6 Claims, 10 Drawing Sheets

(51) Int. Cl.
*A63F 13/795* (2014.01)
*A63F 13/48* (2014.01)
*A63F 13/332* (2014.01)
*A63F 13/323* (2014.01)

(52) U.S. Cl.
CPC .......... *A63F 13/323* (2014.09); *A63F 13/332* (2014.09); *A63F 2300/537* (2013.01)

(58) Field of Classification Search
CPC .......... A63F 2300/572; A63F 2300/556; A63F 2300/402; A63F 2300/40; A63F 2300/406; A63F 2300/537; A63F 2300/403; A63F 2300/5566
See application file for complete search history.

(56) References Cited

U.S. PATENT DOCUMENTS

| | | | | |
|---|---|---|---|---|
| 2004/0082383 | A1* | 4/2004 | Muncaster | A63F 13/12 463/39 |
| 2007/0021216 | A1* | 1/2007 | Guruparan | A63F 13/10 463/43 |
| 2007/0270226 | A1* | 11/2007 | York | A63F 13/00 463/43 |
| 2009/0264201 | A1* | 10/2009 | Ross | 463/42 |
| 2009/0307671 | A1* | 12/2009 | White | A63F 13/10 717/149 |
| 2010/0075761 | A1* | 3/2010 | Lord | A63F 13/85 463/43 |
| 2010/0137046 | A1* | 6/2010 | Kataoka | A63F 13/12 463/1 |
| 2013/0151651 | A1* | 6/2013 | Chhaochharia | A63F 13/358 709/214 |
| 2015/0011277 | A1* | 1/2015 | Wakeford | A63F 13/00 463/1 |

OTHER PUBLICATIONS

Wii U game Cover, release on Nov. 18, 2012, p. 1.*
Anthony Gallegos, Natural Selection 2 Review—IGN, Nov. 5, 2012, http://www.ign.com/articles/2012/11/06/natural-selection-2-review, retrieved on Aug. 16, 2018.*
Ashton Raze, Natural Selection 2 Review—Gamespot, Nov. 13, 2012, https://www.gamespot.com/reviews/natural-selection-2-review/1900-6399998/, retrieved on Aug. 16, 2018.*

* cited by examiner

SYSTEM AND METHOD FOR CROSS-PLATFORM MULTIPLAYER VIDEOGAMES

CROSS REFERENCE TO RELATED APPLICATIONS

This application claims the benefit of the filing of U.S. Provisional Patent Application No. 61/866,005, filed on Aug. 14, 2013, the disclosure of which is incorporated by reference herein.

BACKGROUND OF THE INVENTION

The present invention relates generally to videogames, and more particularly to systems and methods for cross-platform multiplayer gaming across heterogeneous gaming platforms such as videogame consoles, personal computers, mobile devices, smartphones, and tablets.

Videogames are enjoyed by many, often allowing videogame players to virtually participate in otherwise unavailable activities, whether due to requirements of skill, experience, or equipment availability, or simply due to inherent dangers of the activities.

Videogames are increasingly being played on a variety of gaming platforms. In addition to traditional gaming platforms such as videogame consoles and personal computers, videogame players are also gaming on new gaming platforms such as smartphones, tablets, and other mobile devices.

Multiplayer online gaming has gained in popularity over the past few years as well, in part because of the wide availability of Internet connectivity. In many cases, multiplayer games have been played amongst players using the same (or at least comparable) gaming platforms. For example, players on the Microsoft Xbox gaming platform or Sony PlayStation gaming platform generally play with players on their respective gaming platforms. Likewise, players using personal computers generally play multiplayer games with other personal computer users.

BRIEF SUMMARY OF THE INVENTION

Aspects of the present invention relate to a computer-implemented method for conducting an online multiplayer videogame between a first player playing on a first gaming platform and a second player playing on a second gaming platform, comprising: presenting a first gameplay pattern on the first gaming platform; presenting a second gameplay pattern on the second gaming platform; wherein the first gameplay pattern and second gameplay pattern relate to the same virtual environment; and wherein the first player and second player are remotely located from each other.

Aspects of the present invention relate to a computer-implemented method useful in conducting an online multiplayer videogame between a first player playing on a first gaming platform and a second player playing on a second gaming platform, comprising: receiving from the first player a request to initiate an online multiplayer gaming session in which the first player competes against the second player; pairing the first player with the second player; sending a notification to the second player that the multiplayer gaming session has been initiated; presenting to the second player a plurality of response options, said response options comprising at least (i) the option for the second player to join in the multiplayer gaming session and participate in real time and (ii) the option for the second player to designate the computer to conduct gameplay on behalf of the second player.

These and other aspects of the invention are more fully comprehended upon review of this disclosure.

DETAILED DESCRIPTION

Figure 1:
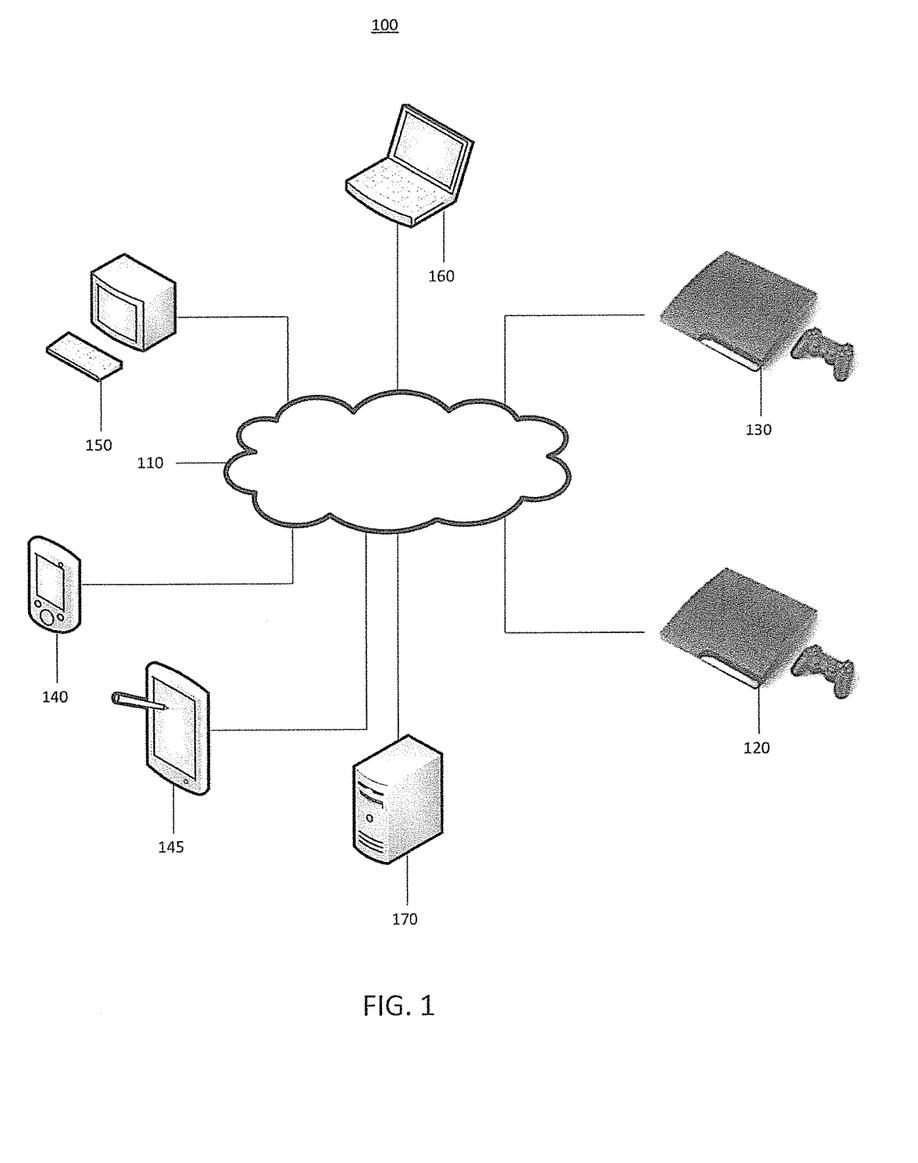
FIG. 1 is a diagram of a system in accordance with aspects of the invention.

FIG. 1 is a block diagram illustrating an exemplary system 100 in accordance with aspects of the present invention. System 100 provides for cross-platform online multiplayer gameplay that involves a plurality of heterogeneous gaming platforms running distinct gameplay patterns.

System 100 also includes gaming platforms 120-160. Gaming platforms 120-160 may comprise various compute devices suitable for executing videogames and communicating over communication network 110. In FIG. 1, system 100 comprises a first gaming platform 120 and a second gaming platform 130, which are videogame consoles. Examples of videogame consoles include the Microsoft Xbox, Sony PlayStation, and Nintendo Wii U. In addition to the videogame consoles, gaming platforms may comprise any other suitable compute devices such as mobile devices (e.g., smartphone 140, tablet 145) and personal computers (e.g., desktop computer 150 and laptop computer 160). The gaming platforms 120-160 each have one or more processors, memory, communication circuitry, and associated hardware. Gaming platforms 120-160 may communicate with other gaming platforms 120-160 by sending and receiving data through communication network 110, which may comprise private and public networks. In many embodiments, communication network 110 comprises the Internet. Of course, the number of devices shown in FIG. 1 is merely exemplary, and in many embodiments, many more devices may be present.

System 100 further includes one or more game servers 170. Game server 170 may comprise modules that provide certain services. As discussed in more detail herein, the modules may include, for example, a matchmaking module, social networking module, data collection module, user profile module, authentication/security module, communication module, and online store module.

Using a gaming platform 120-160, a user can participate in a cross-platform videogame in which gameplay of the videogame on one gaming platform may comprise a different gameplay pattern than for gameplay of the videogame on another gaming platform.

In various embodiments videogames in accordance with aspects of the invention provide for competition between players using "traditional" gaming platforms (e.g., videogame consoles and/or personal computers such as laptops and/or desktops) and players using "non-traditional" devices such as mobile devices (e.g., smartphones, tablets, and PDAs).

In one embodiment a player may play a videogame on different game platforms, with different game play patterns provided depending on a type of game platform utilized by the player at any particular instant. For example, on game platforms with greater display and/or input device capabilities, a first person (or third person) genre game pattern may be provided, while on game platforms with lesser capabilities a strategy genre game pattern may instead be provided. In such an example, a player may play a videogame for a first period of time on a game console while being provided a first person genre game pattern, then transition to play the same game on a tablet computer while being provided a strategy genre game pattern, and transition once again back to play on the game console with provision of the first person genre game pattern.

In another embodiment of a videogame, for example involving a first-person shooter (FPS) videogame, a first player and a second player play an online multiplayer videogame against each other, with the first player playing on a first gaming platform (e.g., a videogame console or personal computer) presented with a gameplay pattern of a traditional FPS, and the second player playing on a second gaming platform (e.g., a mobile device) presented with a gameplay pattern different from a traditional FPS, for example, that of a real-time strategy game or some other gameplay pattern. In some embodiments the first gaming platform is a gaming platform suitable for FPS videogame play. Generally, a gaming platform suitable for FPS gameplay includes a game controller or keypad and mouse as input devices, display size and different processing capabilities for display of a virtual world from a viewpoint of an entity within that world. In some such embodiments, the second gaming platform is a device that is lacking in one or all of screen size, processing capability, or appropriate input devices suitable for FPS gameplay.

In some videogames in accordance with aspects of the invention, each player controls a squad of squad members. The squad may be any size, but in one embodiment, each squad comprises six squad members. In a game session, a first player, an attacker, deploys his squad to attack the base of a second player, a defender. The defender controls his squad to defend his base. In some embodiments, the players compete to accomplish certain objectives, for example, capturing and controlling certain capture points and/or killing the other player's squad members. In some embodiments, a game session ends after one player successfully completes certain predefined game objectives. Additionally or alternatively, the game session may end after a predefined time limit, and the player who completed the most objectives or otherwise scored the most points is the winner.

Figure 2:
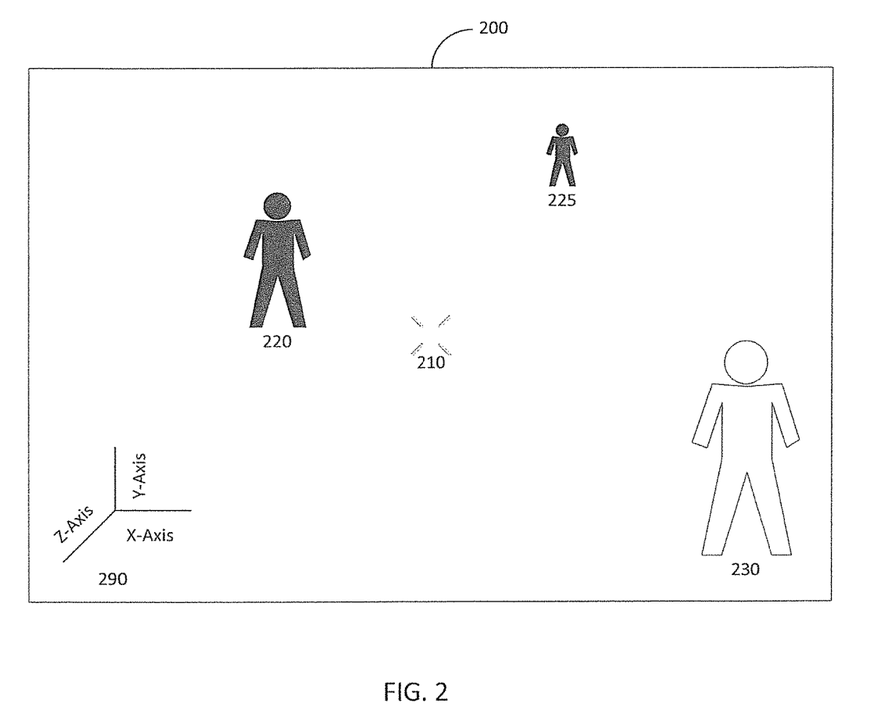
FIG. 2 is a diagram of a first-person shooter genre gameplay pattern in accordance with aspects of the invention.

In some such embodiments, a gameplay pattern presented to a player may be tailored to the characteristics of the player's gaming platform. If, for example, the player's gaming platform is suited for FPS gameplay (e.g., has traditional input devices like a gamepad, keyboard, and/or mouse, has an appropriate display size, has sufficient compute and graphics processing capabilities to display 3D gameplay environments, etc.) such as a videogame console or personal computer, the gameplay pattern may reflect that of a traditional FPS game. FIG. 2 is an example display of a game reflecting a traditional FPS gameplay pattern, albeit in simplified form. In the traditional FPS gameplay pattern 200 depicted in FIG. 2, a player views a virtual environment of a gameworld from the perspective of an avatar controlled by the player. The player may encounter one or more other avatars and targets, for example enemy targets 220 and 225 and teammates or squad members 230. The player controls provides complete control over his avatar, generally without significant computer assistance. In gameplay, the player may also issue commands to his remaining squad members, which are controlled by the computer, in accordance with the issued commands.

In FIG. 2, a z-axis extends away from the facing direction of the player's avatar (not shown in FIG. 2) or viewpoint towards the horizon. (Note that Cartesian axis 290 is included for reference only and in most embodiments would not be displayed in FPS interface 200.) In some embodiments, FPS gameplay pattern 200 may present a crosshair 210 that helps the player aim his weapon. Generally, the position of crosshair 210 relative to the targets when the player fires his weapon determines whether the player hits or misses any given target. In some embodiments, rays representing the trajectory of the fired shots are cast from the center of the screen, or in various embodiments some other point on the screen, for example a bottom center position, towards crosshair 210. If a ray intersects with a target, the target is hit; otherwise, the target is missed. In some embodiments, crosshair 210 is locked to the center of the screen. In other embodiments, crosshair 210 may be freely moved about the screen by the player. Although crosshair 210 is depicted in an "x" configuration, crosshair 210 may be of any configuration, including for example, a cross, a circle, a cross within a circle, etc. In some embodiments, there is no visible crosshair, and shots are simply fired to a predetermined location relative to the player's viewpoint (e.g., the center of the screen). In some embodiments, the FSP gameplay pattern may present a heads-up display (HUD) (not shown) that provides additional information to the player (e.g., information regarding ammunition, weapons, health, mission objectives, maps, time, player-to-player communications, etc.).

Figure 3:
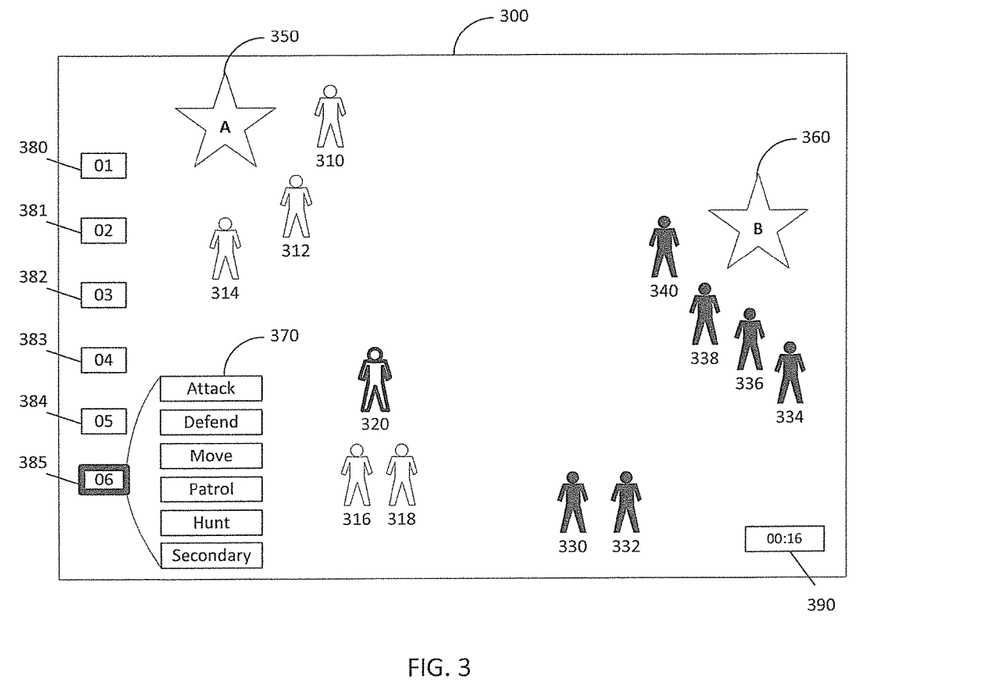
FIG. 3 is a diagram of a real-time strategy genre gameplay pattern in accordance with aspects of the invention.

However, if the player's gaming platform is not well-suited for FPS gameplay, for example, because of the type of input device used by the gaming platform, display size, or compute/graphics processing capabilities, the gameplay may be presented using an alternative gameplay pattern more suited for the gaming platform. In one embodiment, for example, the gameplay may be presented using a real-time strategy gameplay pattern, as shown in FIG. 3. Real-time strategy gameplay pattern 300 of FIG. 3 presents the virtual environment from a substantially top-down view, and allows the player to issue tactical commands to one or more of his squad members. The elements of real-time strategy gameplay pattern 300 may be 2D, 3D, or both, depending on the processing characteristics of the gaming platform. In some embodiments, real-time strategy gameplay pattern 300 allows the player to see both his own squad members 310, 312, 314, 316, 318, and 320 and his opponent's squad members 330, 332, 334, 336, 338, and 340. Alternatively, only a subset of squad members may be visible, for example, the player's squad members and opposing squad members within a certain vicinity of the player's squad members. Real-time strategy gameplay pattern 300, in the embodiment of FIG. 3, further comprises squad member selection buttons 380, 381, 382, 383, 384, and 385, which can be used to select one or more of the player's squad members 310-320. Selecting one or more squad member selection buttons 380-385 causes display of command menu 370, which can be used to issue commands to the selected squad members. In the embodiment of FIG. 3, commands may include, for example, attack, move, defend, guard, patrol, hunt, secondary weapons, retreat, capture, etc. In the example of FIG. 3, the squad member selection button 385 corresponding to the sixth squad member 320 is selected. Thus, by selecting a command from the displayed command menu 370, the player may issue a command to the sixth squad member 320.

Real-time strategy gameplay pattern 300 further displays one or more capture points 350 and 360. In one embodiment, the players compete to capture and control capture points 350 and 360. In some embodiments, real-time strategy genre gameplay pattern 300 further comprises a countdown timer 390, which displays the time remaining before the game completes.

By providing different gameplay patterns for different gaming platforms, gameplay may be tailored to each gaming platform. For example, players playing the game from videogame consoles or personal computers may engage in a FPS gameplay pattern, controlling one of the player's squad members at any given time and issuing tactical commands to the remaining computer-controlled squad members. On the other hand, a player playing the game from a smartphone or tablet would compete using a real-time strategy genre gameplay pattern, which overcomes the difficulty of playing an FPS from a mobile device.

One of ordinary skill would recognize that many of the above details about FPS gameplay patterns and real-time strategy gameplay patterns are exemplary and may be changed in various embodiments in accordance with aspects of the invention. In addition, in some embodiments, the player may select between multiple gameplay patterns. For instance, in some embodiments, players on videogame consoles and/or personal computers may select between an FPS gameplay pattern and a real-time strategy gameplay pattern.

One of ordinary skill would recognize that many of the inventive aspects disclosed herein apply to gaming genres other than FPS games. For example in various embodiments aspects of the invention may be utilized for games including multiplayer games (including massive multiplayer on line role playing games), sport games, including team sport games and one against many games.

Figure 4:
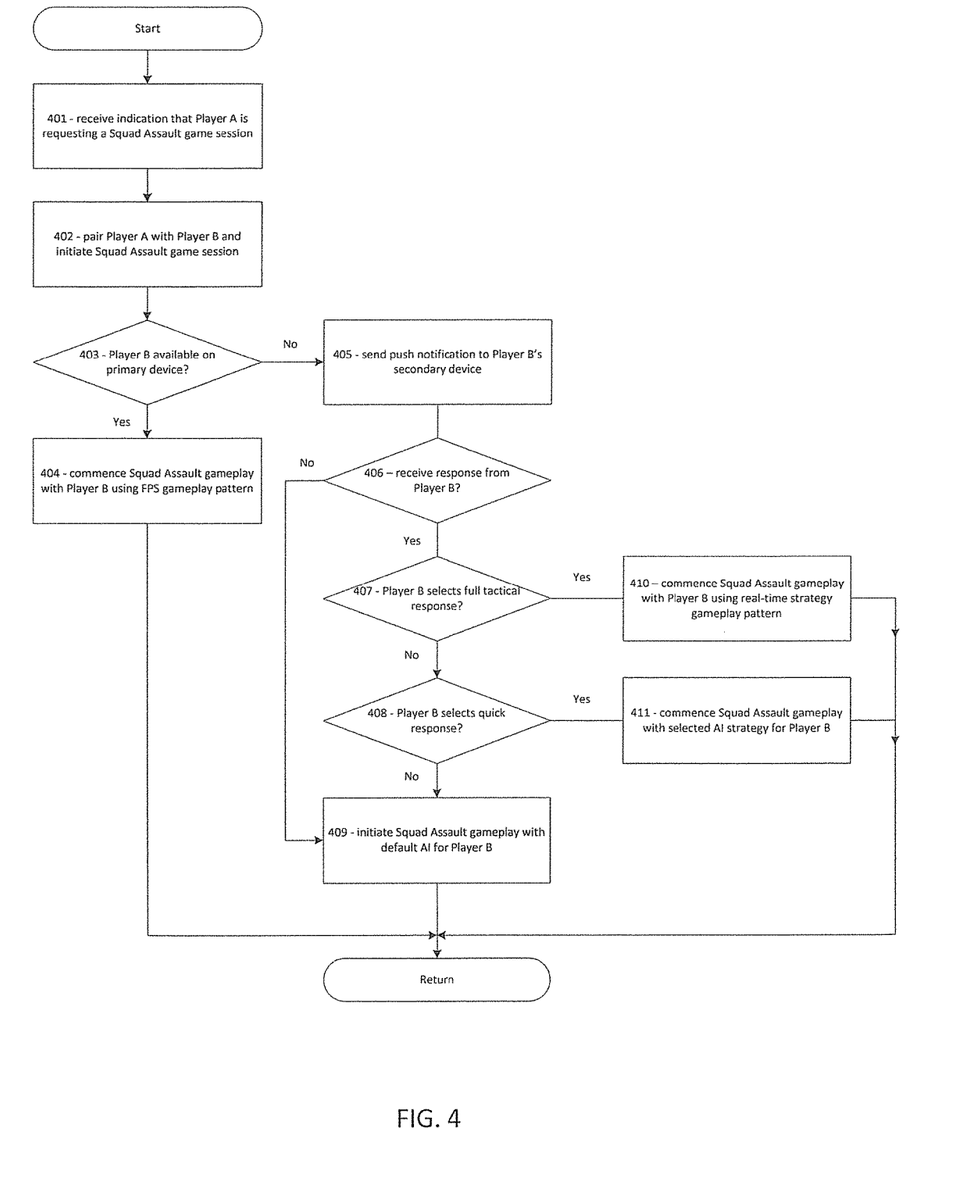
FIG. 4 is a flowchart of a process relating to commencement of gameplay of a multiplayer game with possibly provision of multiple genre gameplay patterns in accordance with aspects of the invention.

FIG. 4 is a flowchart of a process in accordance with aspects of the invention. The process may be performed, for example, by the processor and system described in connection with FIGS. 5 and 6, below, or the system or components thereof of FIG. 1. The process may be useful in initiating a cross-platform multiplayer game in which at least one player has the option of playing from a primary gaming platform such as a videogame console or personal computer and the option of playing from a secondary gaming platform such as a mobile device. The process is described in the context of initiating a game session for a squad-on-squad combat game, but may be useful in initiating any cross-platform multiplayer game in which a player has the option of playing from a both primary device and a secondary device.

In block 401, the process receives an indication that a first player (Player A) is requesting a game session. In some embodiments, Player A requests the game session through the multiplayer matchmaking interface of a videogame played on a videogame console or personal computer. Additionally or alternatively, the request may be made from a mobile device. In some embodiments, the process assigns Player A an "attacker" role in the game session.

In block 402, the process determines suitable opponents for the game session and selects a second player (Player B) for pairing. In some embodiments, this determination is made automatically by the process based on defined characteristics of Player A including without limitation, Player A's skill level, geography, network path quality to other players, social network connection, etc. In some embodiments, instead of the process automatically matchmaking Player A with an opponent, Player A may choose an opponent from certain groups of players, for example, Player A's friends or previous opponents. The process then initiates the game session between Player A and Player B.

In block 403, the process determines whether Player B is currently available for gameplay using a primary device. If so, the process proceeds to block 404, thereby commencing gameplay between Player A and Player B, where Player B is presented a FPS gameplay pattern. If Player B is not available for gameplay using a primary device, the process proceeds to block 405.

In block 405, the process sends a push notification to Player B's secondary device, for example, a smartphone, tablet, or other mobile device. In some embodiments, instead of the process sending a push notification, Player A may manually send a request to Player B's secondary device. In some embodiments, the notification/request includes a message that Player A is attacking Player B's squad, and presents a number of possible responses. For example, in some embodiments, the process may present Player B with the opportunity to participate in the game session in real-time and/or dictate a general strategy for his squad and/or ignore the notification and allow his squad to engage Player A's squad using some default strategy.

In block 406, the process determines if it receives a response from Player B to the push notification. If the process does not receive a response from Player B within a predefined amount of time (e.g., 30 seconds, 45 seconds, 60 seconds, etc.), the process proceeds to block 409 and commences gameplay with Player A competing against Player B's squad, where Player B's squad is AI controlled and follow's a default strategy. If the process receives a response from Player B, the process proceeds to block 407.

In blocks 407 and 408, the process determines the type of response received from Player B. In particular, in block 407, the process determines whether the response indicates that Player B selected a full tactical response to Player A's attack and wishes to participate in the gameplay in real-time. If so, the process proceeds to block 410, where the process commences gameplay between Player A and Player B, where Player B is participating in the gameplay in real-time using a real-time strategy gameplay pattern. Otherwise, the process determines that the response indicates that Player B selected a quick response to Player A's attack (block 408) and proceeds to block 411. In some embodiments, the quick response allows Player B to exert control over his squad without participating in the real-time tactical interface of block 410. For example, in some embodiments, the quick response allows Player B to dictate an overall strategic response to the attack (e.g., target or defend certain capture points, focus on attacking opposing squad members, etc.).

Additionally or alternatively, the quick response may allow Player B to select from a number of squad enhancements or "buffs" to apply to his squad. For example, Player B may have bought or otherwise acquired certain buffs that enhance his squad's attack rate, attack damage, attack accuracy, armor or other defensive attributes, movement speed, secondary attacks, etc.

In block 411, the process commences gameplay between Player A and Player B, where Player B's squad is AI controlled subject to Player B's quick response.

Figure 5:
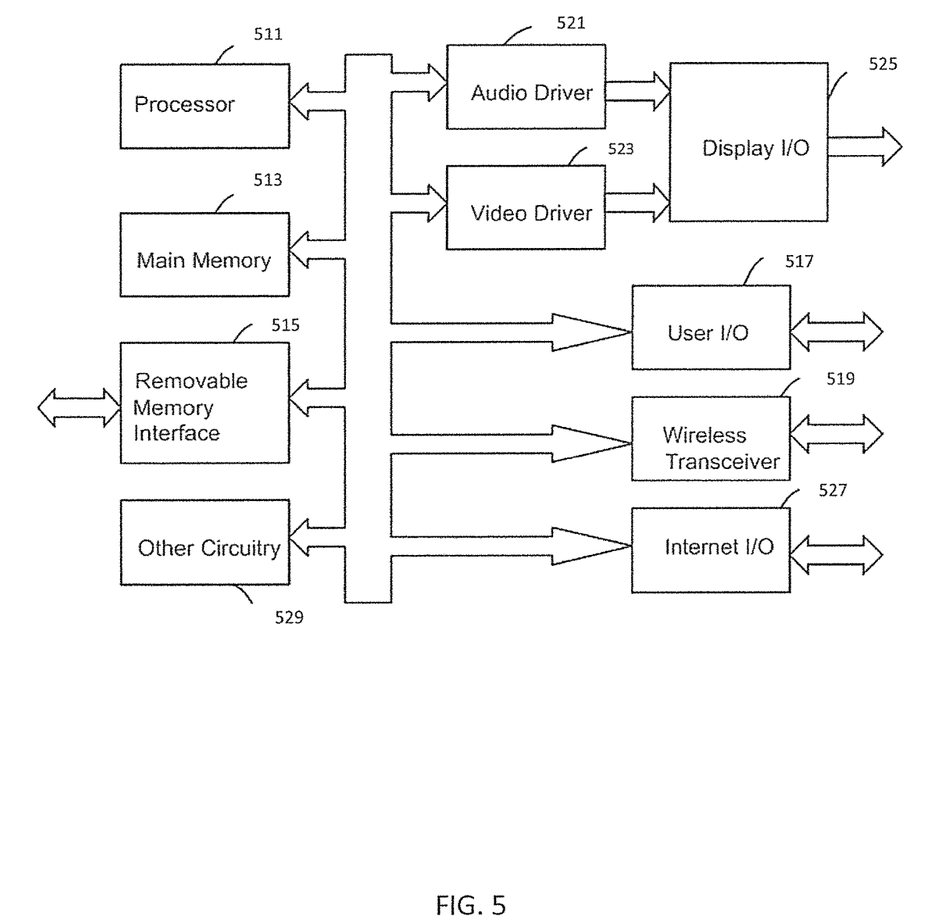
FIG. 5 is a diagram of a processor and related circuitry useful in accordance with aspects of the invention.

FIG. 5 is an example of a block diagram of a processor and associated circuitry useful in a gaming platform in accordance with aspects of the invention. As shown in FIG. 5, a processor 511 is connected to other components via a bus. The other components include a main memory 513 and a removable memory interface 515, which may be coupled to a removable memory device, for example, a SD memory card. The processor may execute instructions retrieved from main memory and/or the removable memory device to control gameplay. For example, the instructions may be for determining possible movements, positions, and locations of the player's avatar and/or targets.

The processor is coupled to an audio driver 521 and a video driver 523. The audio driver produces sound signals and the video driver produces image signals. The sound signals and image signals are transmitted via a display I/O device 525. The display I/O device generally supplies the sound and image signals to sound and display devices that may be external to the gaming platform or incorporated in the gaming platform.

The processor may also be coupled to a user I/O device 517, a wireless transceiver 519, an Internet I/O device 527, and other circuitry 529. The user I/O device may receive signals from an input device (e.g., joystick, gamepad, keyboard, mouse, touchscreen, etc.) being used by the player and provide inputs, for example, during gameplay. The Internet I/O device provides a communication channel that may be used, for example, for multiplayer games.

Figure 6:
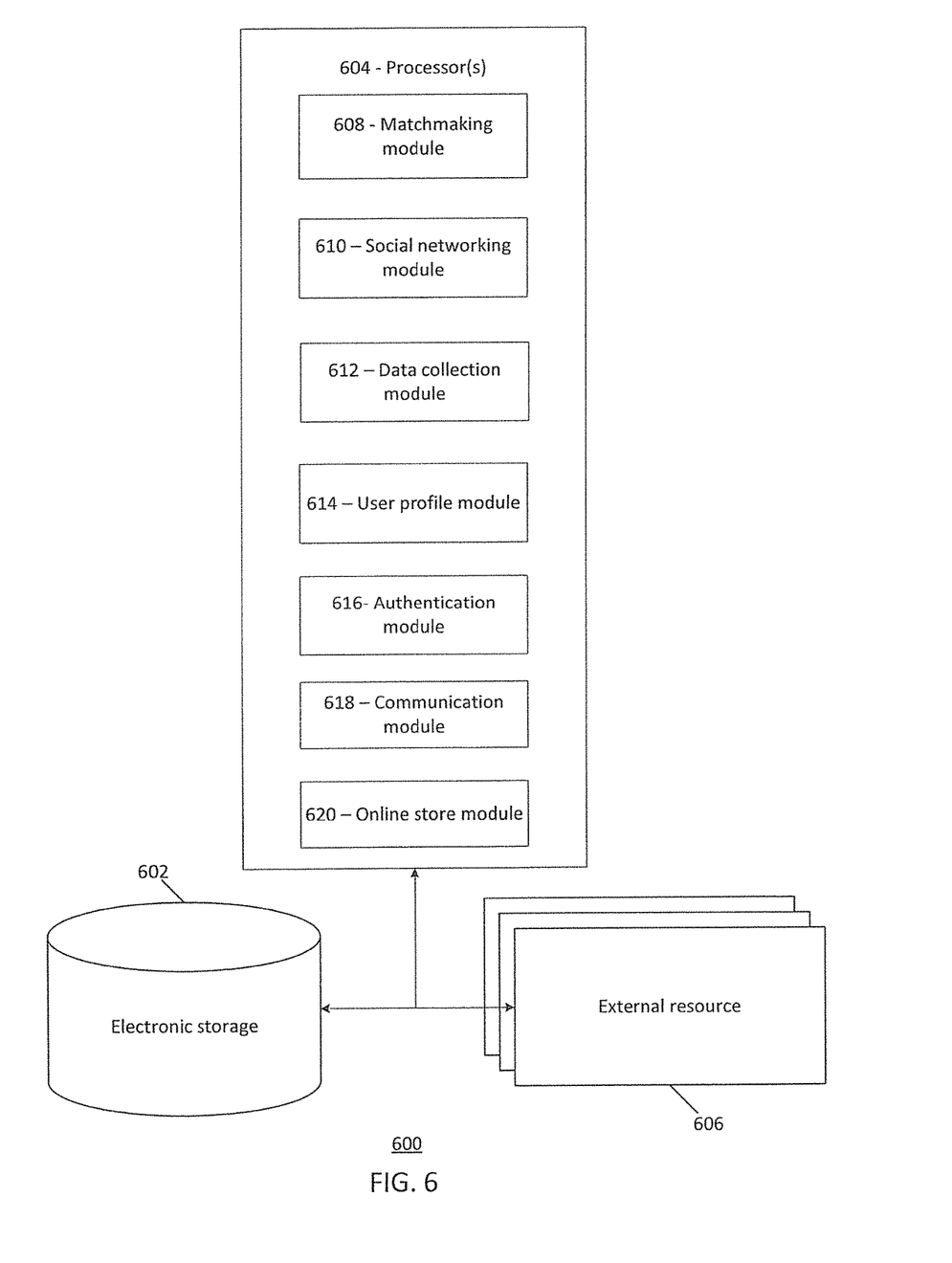
FIG. 6 is a diagram of a processor and related circuitry useful in accordance with aspects of the invention.

FIG. 6 is an example of a block diagram of a game server 600 useful in accordance with aspects of the invention. The game server is coupled to a network (not explicitly shown), for example the internet. In some implementations, game server 600 may comprise one or more of electronic storage 602, processor(s) 604, external resources 606, and/or other components. The various components of game server 600 may be configured for electronic communication among one another. Such communication may be accomplished via one or more networks, one or more direct connections, one or more wireless connections, one or more wired connections, and/or other electronic communication media. Game server 600 may be in communication with user computers and other client computing platforms.

Processor(s) 604 may be configured to provide information processing capabilities within game server 600. For example, processor(s) 604 may configured to execute computer program modules that may include one or more of a matchmaking module 608, a social networking module 610, a data collection module 612, a user profile module 614, an authentication module 616, a communication module 618, and/or other modules. In various embodiments, these modules may perform various operations as further discussed herein.

In some embodiments, matchmaking module 608 performs operations relating to matching users for multiplayer gaming sessions. In some embodiments, matchmaking module 608 matches users seeking an online game session with particular characteristics with users hosting the same online game session with those characteristics. In some embodiments, the users hosting online game sessions act as servers that send game state information to users who have joined the game. For example, a user hosting a game session on his gaming platform may resolve and communicate game state information to player(s) who have joined his gaming session. In some embodiments, matchmaking module 608 matches potential players and hosts based on the players' geography, network connection quality, skill level, experience level, and/or the players' relationship to each other.

In some embodiments, social networking module 610 provides the framework for user-to-user interactions. Social networking module 610 may include a database that stores user relationships, user profiles, user messages, and user social data. Social networking module 610 may provide for social networking features in accordance with the present invention. For example, social networking module 610 may provide the framework to allow a user to "attack" another user's squad.

In some embodiments, user profile module 614 receives and/or determines user information, for example user login names and passwords, email addresses, user skill levels, game system game capabilities, gaming preferences, and/or financial information (e.g., credit card information, billing addresses, and any other information required to complete an e-commerce transaction).

In some embodiments, data collection module 612 performs operations relating to the collection of information regarding potential host systems, user data, social networks, game data, and network connection quality indicators. In some embodiments, authentication module 616 performs operations relating to authentication of users. In some embodiments, communications module 618 performs operations relating to communication with storage and/or external resources, as well as communicating over a network, for example the Internet.

In some embodiments, online store module 620 performs operations relating to conducting e-commerce transactions. For example, online module 620 may host one or more online storefronts. Online store module 620 may further comprise databases that store catalogs of goods and/or services available for purchase. The catalogs may contain the details about the various goods and/or services that can be listed in one or more storefronts, including pricing information, a description of the goods and/or services, fulfillment details, etc.

In some implementations, electronic storage 602 may include information about available games, user profile data, social networking data, data collected from previous gameplay sessions, e-commerce data, and/or other data. In some implementations, electronic storage 602 may comprise non-transitory electronic storage media that electronically stores information. Electronic storage 602 may include one or both of system storage that is provided integrally (e.g., substantially non-removable) with game server 600 and/or removable storage that is removably connectable to online store 400 via, for example, a port (e.g., a USB port, a firewire port, etc.) or a drive (e.g., a disk drive, etc.). Electronic storage 602 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 402 may include virtual storage resources, such as storage resources provided via a cloud and/or a virtual private network. Electronic storage 602 may store software algorithms, information determined by processor 604, and/or other information that enables online store 600 to function properly. Electronic storage 602 may be a separate component within game server 600, or electronic storage 602 may be provided integrally with one or more other components of game server 600. For example, in certain implementations, the non-transitory electronic storage media of electronic storage 602 may include a cache (e.g., L1 cache, L2 cache, etc.) of processor 604.

In some implementations, electronic storage 602, processor(s) 604, external resources 606, and/or other components (e.g., additional instances of game servers) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which electronic storage 602, processor(s) 604, external resources 606, and/or other components may be operatively linked via some other communication media.

In some implementations, the external resources 606 may include services and information sources external to game server 600, for example, third-party social networking services external to game server 600, third-party merchandising databases and catalogs, web hosting services, game server services, media streaming services, etc. In some implementations, some or all of the functionality attributed herein to external resources 606 may be provided by resources included in game server 600.

In some implementations, processor(s) 604 may include one or more of a digital processor, an analog processor, a digital circuit designed to process information, an analog circuit designed to process information, a state machine, and/or other mechanisms for electronically processing information. Although processor(s) 604 is shown in FIG. 6 as a single entity, this is for illustrative purposes only. In some implementations, processor(s) 604 may include a plurality of processing units. These processing units may be physically located within the same device, or processor(s) 604 may represent processing functionality of a plurality of distributed devices operating in coordination.

Processor(s) 604 may be configured to execute matchmaking module 608, social networking module 610, data collection module 612, user profile module 614, authentication module 616, communication module 618, online store module 620, and/or other modules. Processor(s) 604 may be configured to execute modules 608, 610, 612, 614, 616, 618, 620, and/or other modules by software; hardware; firmware; some combination of software, hardware, and/or firmware; and/or other mechanisms for configuring processing capabilities on processor(s) 604.

It should be appreciated that although modules 608, 610, 612, 614, 616, 618, and 620 are illustrated in FIG. 6 as being co-located within a single processing unit, in implementations in which processor(s) 604 includes multiple processing units, one or more of modules 608, 610, 612, 614, 616, 618, and 620 may be located remotely from the other modules. The description of the functionality provided by the different modules 608, 610, 612, 614, 616, 618, and 620 provided herein is for illustrative purposes, and is not intended to be limiting, as any of modules 608, 610, 612, 614, 616, 618, and 620 may provide more or less functionality than is described. For example, one or more of modules 608, 610, 612, 614, 616, 618, and 620 may be eliminated, and some or all of its functionality may be provided by other ones of modules 608, 610, 612, 614, 616, 618, and 620. As another example, processor 604 may be configured to execute one or more additional modules that may perform some or all of the functionality attributed below to one of modules 608, 610, 612, 614, 616, 618, and 620.

Figure 7:
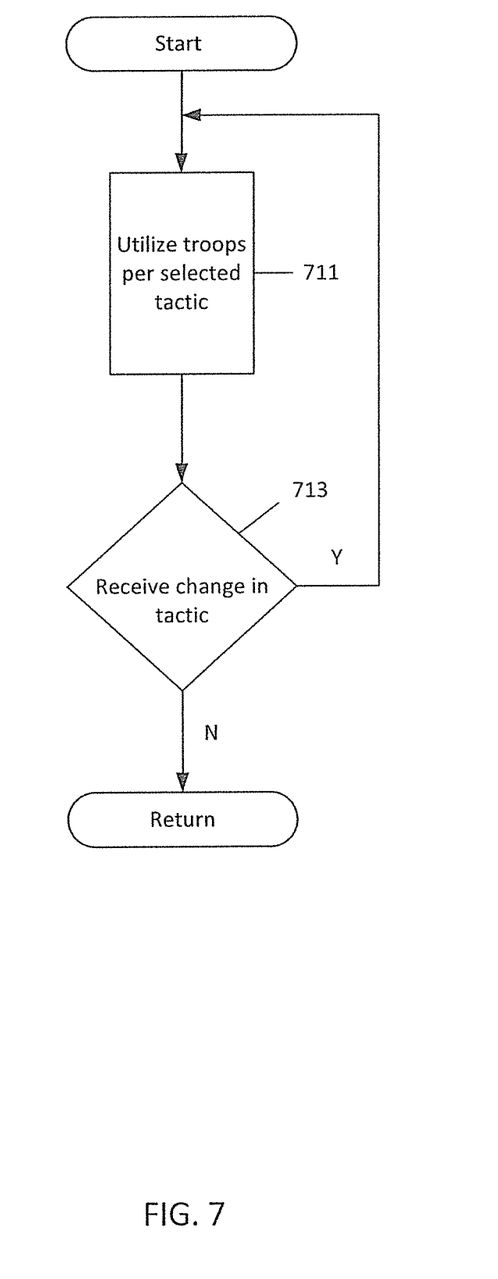
FIG. 7 a flow chart of a process relating to squad utilization in accordance with aspects of the invention.

FIG. 7 is a flow diagram of a process relating to squad utilization in accordance with aspects of the invention. The process may be performed, for example, by the processor and system described in connection with FIGS. 5 and 6, or the system or components thereof of FIG. 1. In some embodiments the process of FIG. 7 is utilized in performing operations of blocks 409 and/or 411 of the process of FIG. 4.

In block 711 the process utilizes troops in accordance with a selected tactic. The tactic may also be considered a strategy, in some instances. In some embodiments the selected tactic is a tactic selected by a user, with a default tactic being considered the selected tactic absent a selection by the user. In some embodiments the selected tactic is one of a predefined plurality of tactics, and in some such embodiments one of the tactics is an initial default tactic. For example, in some embodiments the plurality of tactics include a base defense tactic, a patrol tactic, an attack tactic, and a hunt tactic; and one of those tactics, for example the defend base tactic may serve as an initial default tactic.

In many embodiments the troops are utilized in accordance with program instructions that provide for actions of computer controlled troop members that comprise the troops. For example, the program instructions may provide that upon occurrence of certain predefined events, for example an enemy within a predefined radius of a member of the troop, certain actions will be taken by one or more of the troop members, for example all members of the troop will attack that enemy. In some embodiments the program instructions may be considered to provide artificial intelligence (AI) control of the troops, which may be a simple version of AI, with predefined responses for predefined situations, or more complex versions of AI, with for example responses being modified learning, for example based on outcomes of responses to prior similar events.

In some embodiments in a base defense tactic, the process places troop members about a base in a predefined pattern, and has the troop members attack enemies that are within a predefined distance to the base. In some embodiments in a patrol tactic, the process has troop members move about in a predefined pattern, attacking enemies that are within a predefined distance of the troop members as they travel in the predefined pattern. In some embodiments in an attack tactic, the process has the troops move towards an object of value, for example an enemy base, and has the troop members attack enemies between them and the enemy base. In some embodiments in a hunt tactic, the process has the troop members move towards any sighted enemies, and attack those enemies. In various embodiments these tactics are varied and/or elaborated, and in various embodiments other tactics are provided for in addition or instead.

In block 713 the process determines if the process has received a change in tactics. For example, in some embodiments the user may change the selected tactic, for example by way of a user interface. If the process has received a change in tactic, the process returns to block 711 and utilizes the troops in accordance with the selected tactic. Otherwise the process returns, with in various embodiments the process continuing to utilize the troops in accordance with the previous selected (or default) tactic.

Figure 8:
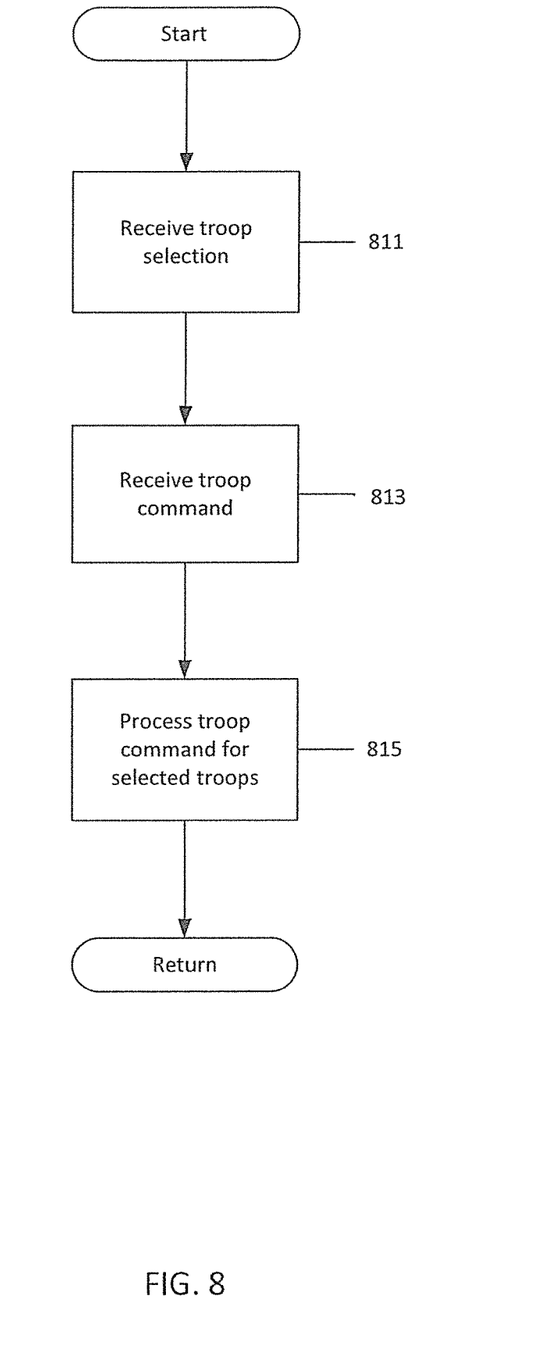
FIG. 8 is a flow chart of a further process relating to squad utilization in accordance with aspects of the invention.

FIG. 8 is a flow diagram of a further process relating to squad utilization in accordance with aspects of the invention. The process may be performed, for example, by the processor and system described in connection with FIGS. 5 and 6, or the system or components thereof of FIG. 1. In some embodiments the process of FIG. 8 is utilized in performing operations of blocks 410 of the process of FIG. 4.

In block 811 the process receives a selection of particular members of a troop. The members of the troop are, in most embodiments, members of a troop controlled by a game player. The selection may be a selection of all members of the troop controlled by the game player or a subset of members of such troop, the subset being one or more, but less than all, members of the troop. In some embodiments the selection is received by way of the game player using a user interface of a device, for example a tablet or smartphone, to indicate to the process the selected members of the troop.

In block 813 the process receives a command for the selected members. The command may be a command from a limited set of options presented by the process to the game player, in some embodiments. For example, in some embodiments the process may provide options for the selected members to attack, to patrol, to defend, or to take some other identified action. In some embodiments the command may identify a location or goal, and an action to take with respect to the location or goal. The location may be, for example, a location in a game world. The goal may be, for example, to control an object within the game world or to effect a result on an entity, for example an enemy, in the game world. In some embodiments the command is received by way of the game player using the user interface of a device, for example a tablet or smartphone, to indicate to the process the command for the selected members.

In block 815 the process processes the command for the selected members. In most embodiments processing of the command includes having the selected members moves and/or has the selected members take actions consistent with the command. For example, if a command is for the selected members attack enemies about a particular location, the process may move the selected towards the particular location and have the members attack enemies within a predefined radius of the particular location.

The process thereafter returns.

Figure 9:
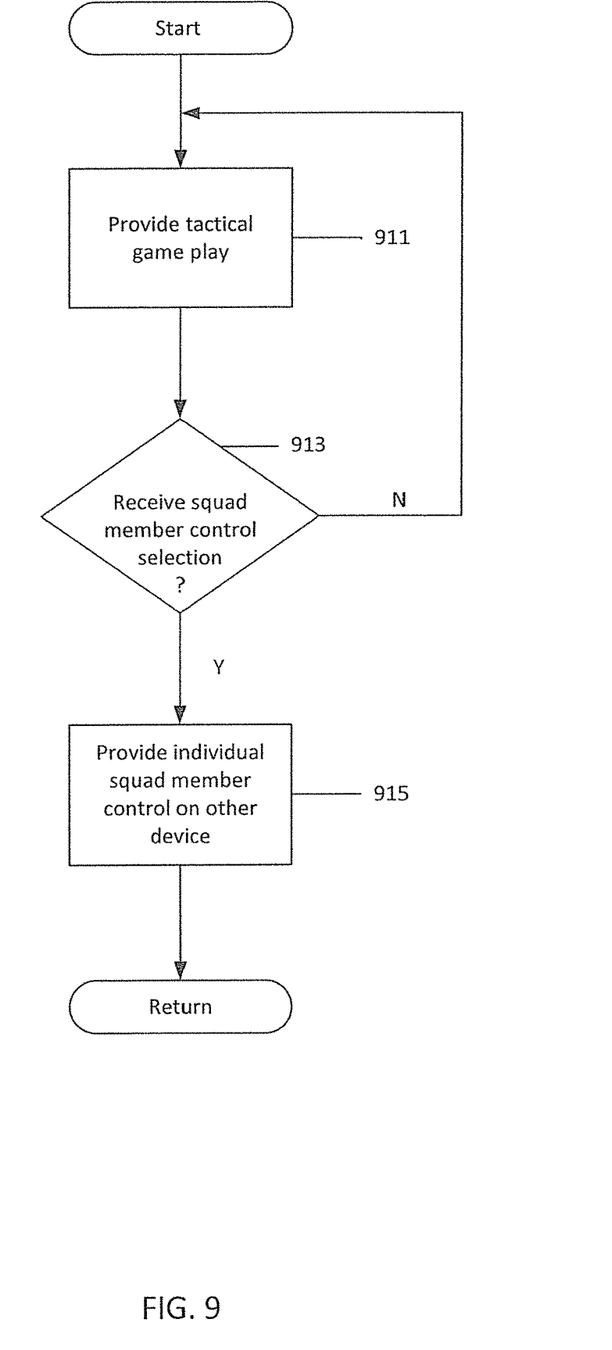
FIG. 9 is a flow chart of a process related to transitioning from game play with a strategy game play pattern to game play with a first person game play pattern in accordance with aspects of the invention.

FIG. 9 is a flow diagram of a process related to transitioning from game play with a strategy game play pattern to game play with a first person game play pattern in accordance with aspects of the invention. The process may be performed, for example, by the processor and system described in connection with FIGS. 5 and 6, or the system or components thereof of FIG. 1.

In block 911 the process provides game play of a game on a first device using a first game play pattern, for example a strategy genre game play pattern. For some games the strategy genre game play pattern could be considered to provide for tactical game play, with for example a game player providing general commands for activities of game entities otherwise under computer control consistent with the general commands. In some embodiments the game entities are members of a troop, squad, or team. For example, in some embodiments the game entities are members of a squad of soldiers, and in some embodiments the game entities are members of a football team. In some embodiments the strategy game play pattern provides for a top-down world view of a game world or portions of the game world, and allows for provision of general commands to a plurality of entities within the game world and, in some embodiments, selection of various ones or some of those entities to which the commands apply. For example, in some embodiments the game play pattern allows for selection of a play for execution by an otherwise AI controlled football team, or in some embodiments the game play pattern allows for selection of a tactic or action to take with respect to a location or goal for an otherwise AI controlled group of soldiers. In some embodiments the first device may be a tablet or smartphone, and in some embodiments is any device not well suited for game play using a first person game play pattern, for example due to graphics display or processing limitations or user input device limitations.

In block 913 the process determines if a request has been made for individual detailed control of a one of the game entities. For example, in some embodiments a game player may request individual detailed control of a member of a squad of soldiers, or individual detailed control of for example a running back of a football team. The request is generally made by receipt of a user input to the first device indicative of a request for such control. A user may make such a request for any reason or no reason, in various embodiments, but a user may desire to make such a request if another more capable device has become available for use by the user, or if the user believes that game play has reached a state where individual detailed control of a game entity may be more likely to lead to a successful game outcome for the user. For example, the user may believe that the user possesses greater level of skill in controlling a particular game entity than AI control otherwise provided, and that game play has entered a critical phase necessitating employment of the user's greater level of skill. If the process determines that a request for individual detailed control of a one of the game entities has been made the process continues to block 915, otherwise the process returns to block 911.

In block 915 the process provides game play of the game on a second device using a second game play pattern, for example a first person genre game play pattern. In the second game play pattern the process allows a user to individually control actions of a one of the game entities. For example, in a football related sports videogame, the second game play pattern may provide for first person (or third person) control of a running back, and in a shooter related videogame, the second game play pattern may provide for first person control of an individual soldier. In many embodiments the second device is a device well suited for game play using a first person game play pattern. In some embodiments the second device is a game console or a personal computer.

Figure 10:
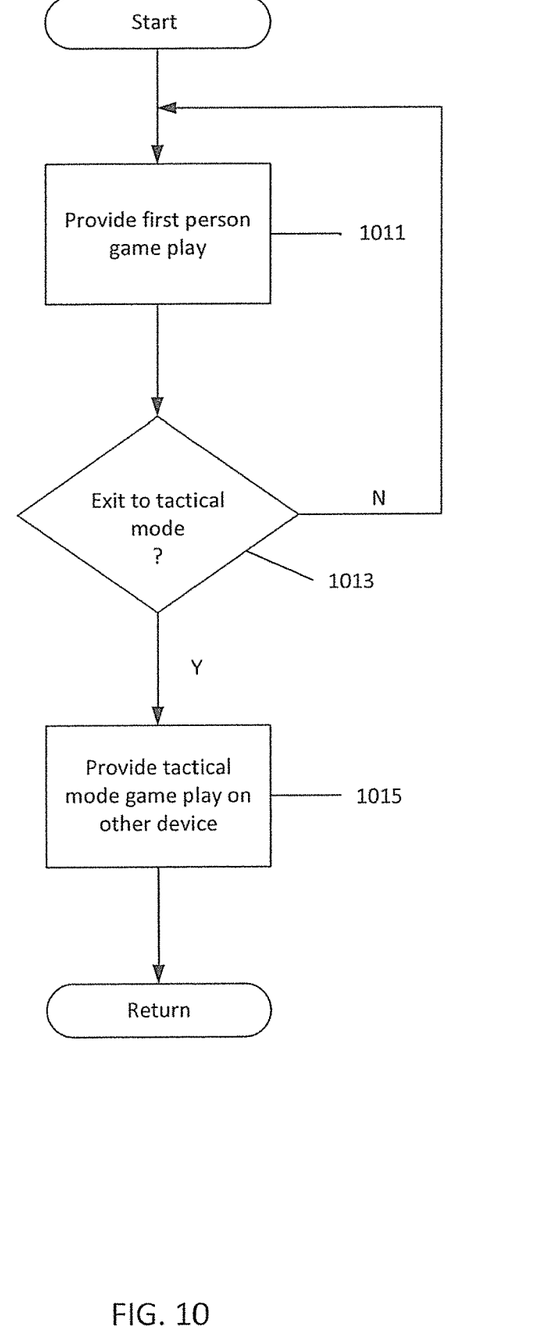
FIG. 10 is a flow chart of a process related to transitioning from game play with a first person game play pattern to game play with a strategy game play in accordance with aspects of the invention.

FIG. 10 is a flow diagram of a process related to transitioning from game play with a strategy game play pattern to game play with a first person game play pattern in accordance with aspects of the invention. The process may be performed, for example, by the processor and system described in connection with FIGS. 5 and 6, or the system or components thereof of FIG. 1.

In block 1011 the process provides game play of a game on a second device using a second game play pattern, for example a first person genre game play pattern. In the second game play pattern the process allows a user to individually control actions of a one of the game entities. For example, in a football related sports videogame, the second game play pattern may provide for first person (or third person) control of a running back, and in a shooter related videogame, the second game play pattern may provide for first person control of an individual soldier. In many embodiments the second device is a device well suited for game play using a first person game play pattern. In some embodiments the second device is a game console or a personal computer.

In block 1013 the process determines if a request has been made for relinquishment of individual detailed control of the one of the game entities, with control instead to be a tactical or strategic control. For example, in some embodiments a game player may request tactical control of a squad of soldiers, or a level of control at only a play calling level of a football team. The request is generally made by receipt of a user input to the first device indicative of a request for such control. If the process determines that a request for relinquishment of individual detailed control of the one of the game entities has been made the process continues to block 1015, otherwise the process returns to block 1011.

In block 1015 the process provides game play of the game on a first device using a first game play pattern, for example a strategy genre game play pattern. For some games the strategy genre game play pattern could be considered to provide for tactical game play, with for example a game player providing general commands for activities of game entities otherwise under computer control consistent with the general commands. In some embodiments the game entities are members of a troop, squad, or team. For example, in some embodiments the game entities are members of a squad of soldiers, and in some embodiments the game entities are members of a football team. In some embodiments the strategy game play pattern provides for a top-down world view of a game world or portions of the game world, and allows for provision of general commands to a plurality of entities within the game world and, in some embodiments, selection of various ones or some of those entities to which the commands apply. For example, in some embodiments the game play pattern allows for selection of a play for execution by an otherwise AI controlled football team, or in some embodiments the game play pattern allows for selection of a tactic or action to take with respect to a location or goal for an otherwise AI controlled group of soldiers. In some embodiments the first device may be a tablet or smartphone, and in some embodiments is any device not well suited for game play using a first person game play pattern, for example due to graphics display or processing limitations or user input device limitations.

The process thereafter returns.

In various embodiment the processes of FIGS. 9 and 10 may be provided during a single gameplay session of a videogame. For example, in some embodiments a user may repeatedly switch between devices and game play patterns at the user's option, allowing the user to effectively alternate between high level control of a plurality of game entities and detailed control of a one of those game entities when desired. Moreover, in various embodiments different ones of the game entities may be the subject of detailed control when desired. For example, in a shooter game in which a plurality of squads are subject to control of a user, the user may select a member of different squads for individual control, depending on the vagaries of game play.

Although the invention has been discussed with respect to various embodiments, it should be recognized that the invention comprises the novel and non-obvious claims supported by this disclosure. Furthermore, all or portions of the subject innovation can be implemented as a system, method, apparatus, or article of manufacture using standard programming and/or engineering techniques to produce software, firmware, hardware or any combination thereof to control a computer to implement the disclosed innovation.

What is claimed is:

1. A computer-implemented method for conducting an online multiplayer videogame between a first player playing the videogame on a first gaming platform and a second player playing the videogame on a second gaming platform, comprising:

presenting a first genre gameplay pattern for play of the videogame by the first player on the first gaming platform, wherein the first gaming platform is either a videogame console or a personal computer;

presenting a second genre gameplay pattern, instead of the first genre gameplay pattern, for play of the videogame by the second player on the second gaming platform, wherein the second gaming platform is a mobile device;

wherein the first genre gameplay pattern and second genre gameplay pattern provide presentations of the same virtual environment;

wherein the first player and second player are remotely located from each other; and wherein the first genre gameplay pattern provides for individual detailed control of game entity from a first plurality of game entities in a first squad of game entities by the first player in the videogame and the second genre gameplay pattern provides for artificial intelligence control, subject to commands by the second player, of each of a second plurality of game entities in a second squad.

2. The method of claim 1 wherein the first genre gameplay pattern is that of a first-person shooter game.

3. The method of claim 1 wherein the second genre gameplay pattern is that of a real-time strategy game.

4. The method of claim 1, wherein the first player and the second player are playing against each other.

5. The method of claim 1, further comprising presenting the first genre gameplay pattern on a third gaming platform, for play of the videogame by the second player.

6. The method of claim 5, wherein presentation of the first genre gameplay pattern on the third gaming platform is in response to a request provided on the second game platform.

* * * * *